US012142240B2

(12) United States Patent
Park et al.

(10) Patent No.: US 12,142,240 B2
(45) Date of Patent: Nov. 12, 2024

(54) APPARATUS AND METHOD FOR PROVIDING COMPENSATION INFORMATION FOR DEMURA AND DISPLAY DRIVING APPARATUS USING COMPENSATION INFORMATION

(71) Applicant: LX Semicon Co., Ltd., Daejeon (KR)

(72) Inventors: Jun Young Park, Daejeon (KR); Min Ji Lee, Daejeon (KR); Gang Won Lee, Daejeon (KR); Young Kyun Kim, Daejeon (KR); Ji Won Lee, Daejeon (KR); Suk Ju Kang, Daejeon (KR); Joo Sung Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 133 days.

(21) Appl. No.: 17/903,955

(22) Filed: Sep. 6, 2022

(65) Prior Publication Data

US 2023/0073179 A1 Mar. 9, 2023

(30) Foreign Application Priority Data

Sep. 9, 2021 (KR) ........................ 10-2021-0120234

(51) Int. Cl.
*G09G 5/00* (2006.01)

(52) U.S. Cl.
CPC ..... *G09G 5/006* (2013.01); *G09G 2320/0247* (2013.01); *G09G 2320/0285* (2013.01); *G09G 2340/02* (2013.01)

(58) Field of Classification Search
CPC ................. G09G 3/2007; G09G 5/006; G09G 2320/0233; G09G 2360/122; G09G 2320/0247; G09G 2340/02; G09G 2320/0285; G09G 5/363; G09G 5/39; G09G 2320/0666; G09G 5/02; G06T 9/00; G06T 11/00; G06T 15/005
See application file for complete search history.

(56) References Cited

U.S. PATENT DOCUMENTS

| | | | | |
|---|---|---|---|---|
| 11,908,376 B1 * | 2/2024 | Wang | G09G 3/2092 | |
| 2004/0151390 A1 * | 8/2004 | Iwamura | H04N 19/107 | 375/E7.257 |
| 2012/0170667 A1 * | 7/2012 | Girardeau, Jr. | H04N 19/61 | 375/E7.027 |
| 2018/0020232 A1 * | 1/2018 | Saeedi | H04N 19/186 | |
| 2022/0020181 A1 * | 1/2022 | Lee | H04N 19/186 | |
| 2022/0246108 A1 * | 8/2022 | Park | G09G 3/3648 | |

FOREIGN PATENT DOCUMENTS

| | | |
|---|---|---|
| KR | 2007-0057618 A | 6/2007 |
| KR | 2008-0024796 A | 3/2008 |
| KR | 2017-0026975 A | 3/2017 |

* cited by examiner

*Primary Examiner* — Xilin Guo
(74) *Attorney, Agent, or Firm* — POLSINELLI PC

(57) ABSTRACT

The present disclosure discloses an apparatus and method for providing compensation information, which compress the compensation information for demura and a display driving apparatus for solving a defect in a screen by using compressed compensation information. The apparatus for providing compensation information includes a compensation value provision unit configured to provide compensation values of pixels and a compression unit configured to perform compression on the compensation values for each block of a screen.

20 Claims, 7 Drawing Sheets

APPARATUS AND METHOD FOR PROVIDING COMPENSATION INFORMATION FOR DEMURA AND DISPLAY DRIVING APPARATUS USING COMPENSATION INFORMATION

BACKGROUND

1. Technical Field

The present disclosure relates to an apparatus and method for providing compensation information, which compress compensation information for demura, and a display driving apparatus for solving a defect in a screen by using compressed compensation information.

2. Related Art

An LCD panel or an OLED panel is a lot used as a display panel.

The display panel may have a defect, such as mura, for a reason such as an error in a manufacturing process.

Illustratively, mura means a defect that a spot having irregular luminance occurs in a specific pixel or some area of a screen that is displayed on the display panel.

A defect, such as the mura, may be increased as the size of the display panel is increased, and acts as an important factor that determines the quality of the display panel.

Accordingly, a defect, such as mura, needs to be effectively compensated for in order to improve the quality of the display panel.

A defect in a screen may be solved by compensating for luminance of display data for each pixel.

The display panel may be constructed to display a screen in response to a source signal that is provided by a display driving apparatus. The display driving apparatus is constructed to receive display data and to output the source signal corresponding to the display data.

The display driving apparatus may store compensation information for compensating for luminance of display data in order to solve a defect in a screen, and may provide a source signal capable of compensating for a defect in a screen by compensating for luminance of display data for each pixel by the stored compensation information.

The amount of compensation information for compensating for a defect in a screen is increased as the size of the display panel is increased. The display driving apparatus requires a high-capacity memory for storing compensation information as the amount of the compensation information is increased.

The high-capacity memory may disadvantageously act in terms of the design of the display driving apparatus composed of an IC or in terms of a production cost. Accordingly, the compensation information needs to be compressed in order to reduce a required memory capacity.

When an error occurs in a process of compressing compensation information, defect compensation efficiency of a screen may be degraded. Block-based compression for dividing a screen into a plurality of blocks and compressing compensation information may be used in order to prevent an error from increasing.

However, representatively, the block-based compression may have a block artifact problem. The artifact may occur between blocks if compensation information is compressed at a high compression ratio and a block selected for compression is large.

Accordingly, in order to reduce an error and prevent an artifact in a compression process, compensation information needs to be efficiently compressed for in a way to have association between adjacent pixels or blocks.

SUMMARY

Various embodiments are directed to providing an apparatus and method for providing compensation information for demura, which can reduce a memory capacity necessary for storage by efficiently compressing compensation values for each pixel for compensating for a defect in a screen.

Furthermore, various embodiments are directed to providing an apparatus and method for providing compensation information for demura, which can prevent the occurrence of an artifact between blocks that are divided for compression and can compress compensation values for each pixel so that the compensation values have association between adjacent pixels or blocks.

Furthermore, various embodiments are directed to providing a display driving apparatus using compensation information, which can solve a defect in a screen by compensating for luminance for each pixel by using compensation information that is compressed as described above.

In an embodiment, an apparatus for providing compensation information for demura may include a compensation value provision unit configured to provide compensation values of pixels, and a compression unit configured to divide a screen into a plurality of blocks, generate a primary compression map and a representative value for primary compression by performing the primary compression on the compensation values for each block, and generate a secondary compression map and a reference value for secondary compression by performing the secondary compression on the representative values of the blocks.

The primary compression may include extracting the representative value for the compensation values of the block, extracting difference values between the representative values and the compensation values, and generating the primary compression map corresponding to pixels of the block by the difference values.

Furthermore, the secondary compression may include setting a reference value of the representative values, performing differential coding on the representative values by using the reference value, and generating the secondary compression map corresponding to the blocks by coding values that are generated as results of the differential coding.

In another embodiment, a method of providing compensation information for demura may include dividing a screen into a plurality of blocks, performing primary compression on compensation values of pixels for each block, and generating a primary compression map and a representative value for the primary compression by the primary compression, and performing secondary compression on the representative values of the blocks, and generating a secondary compression map and a reference value for the secondary compression by the secondary compression. The primary compression may include extracting the representative value for the compensation values of the block, extracting difference values between the representative values and the compensation values, and generating the primary compression map corresponding to pixels of the block by the difference values. The secondary compression may include setting a reference value of the representative values, performing differential coding on the representative values by using the reference value, and generating the secondary compression map corresponding to the blocks by coding values that are generated as results of the differential coding.

In still another embodiment, a display driving apparatus may include a compensation information storage unit configured to store and provide primary compression maps having difference values, a secondary compression map having coding values, and a reference value, a compensation value generation unit configured to convert the coding values of the secondary compression map into representative values of a plurality of blocks divided from a screen by using the reference value, convert the difference values of the primary compression maps into compensation values corresponding to pixels of a corresponding block by using the representative values for each block, and provide the compensation value for each pixel, and a defect compensation unit configured to receive display data and the compensation value for each pixel, compensate for the display data by using a compensation equation in which the compensation value has been applied to a coefficient value, and output the display data that has been compensated for.

The present disclosure has effects in that it can efficiently compress compensation values through primary compression for blocks and secondary compression for representative values of the blocks, and can efficiently reduce the capacity of a memory for storing compensation information for compensating for a defect in a screen.

Furthermore, the present disclosure has an effect in that it can solve an increase in an error, which is attributable to the propagation of the error, by separately performing compression on representative values of blocks and compression on compensation values of the blocks in the block-based compression.

Furthermore, the present disclosure has an effect in that it can solve a block artifact problem which chiefly occurs in the block-based compression because compensation values of pixels are compressed in a block unit.

Furthermore, the present disclosure has effects in that it may have a low loss or may not have a loss by performing secondary compression using adjacent blocks that usually have similar values and can thus increase a compression ratio of compensation information.

DETAILED DESCRIPTION

The present disclosure is to solve a defect having a spot form, such as mura, in a screen of a display panel. In the description of the present disclosure, to solve a defect, such as mura, is defined as demura.

The defect in the screen needs to be solved in order to improve picture quality.

Figure 1:
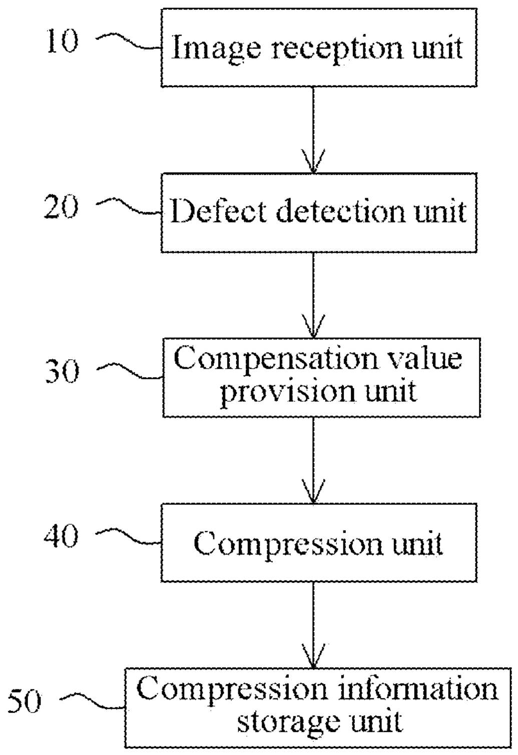
FIG. 1 is a block diagram illustrating a preferred embodiment of an apparatus for providing compensation information for demura according to the present disclosure.

A defect in a screen may be analyzed by an embodiment of an apparatus for providing compensation information in FIG. 1. The apparatus for providing compensation information may generate, compress, and store correction information according to the results of the analysis.

Referring to FIG. 1, an apparatus for providing compensation information may be illustrated as including an image reception unit 10, a defect detection unit 20, a compensation value provision unit 30, a compression unit 40, and a compression information storage unit 50.

A test for a defect may be performed on a plurality of grayscales. Reference display data may be sequentially provided to a display panel (not illustrated) for each grayscale. Illustratively, the display panel may be driven to display a test screen in accordance with the reference display data that is provided to all pixels as the same grayscale value. Furthermore, the display panel may sequentially display the test screens for each grayscale.

The analysis of the test screen and the generation, compression, and storage of correction information are performed in the same way for each grayscale, and a redundant description thereof is omitted.

The image reception unit 10 is constructed to receive a test screen of a display panel (not illustrated) having a specific grayscale and to provide test display data corresponding to the test screen. The image reception unit 10 may be constructed to provide the test data of the test screen, which is obtained by measuring luminance for each pixel, by using a method such as photographing or a luminance measurement unit.

The defect detection unit 20 compares the test data with reference data that has been previously stored, detects defect information for each pixel by a result of the comparison, and provides the defect information.

It may be understood that the reference data has a value that corresponds to normal luminance corresponding to reference display data, that is, reference luminance.

In the case of a pixel having mura, illustratively, test data of the corresponding pixel may have a value corresponding to luminance that is lower or higher than luminance of the reference data.

It may be understood that the defect detection unit 20 detects defect information for each pixel, which corresponds to a difference between luminance corresponding to the test data and luminance corresponding to the reference data.

The compensation value provision unit 30 receives defect information for each pixel, and generates, as a compensation value, a coefficient value corresponding to the defect information for each pixel.

The present disclosure may exemplify that a defect in a screen is compensated for by using a compensation equation composed of a quadratic expression. In this case, it may be understood that the compensation equation is the same Equation 1.

$$Y=aX^2+bX+C \qquad \text{[Equation 1]}$$

In Equation 1, Y is a luminance value that will compensate for a defect in a pixel. X is a normal luminance value of the pixel. That is, it may be understood that Y is a difference value between a luminance value of a pixel having a defect and a normal luminance value of the pixel.

Furthermore, coefficient values of the dimensions of the compensation equation are represented as a, b, and c, respectively.

The compensation value provision unit 30 generates the coefficient values a, b, and c of the compensation equation for compensating for a defect in a screen, and provides location information for each pixel and the coefficient values. Hereinafter, the coefficient values are described as compensation values.

The compensation value provision unit 30 may provide a compensation value for each coefficient. The compression unit 40 to be described later may perform compression for each coefficient. In an embodiment of the present disclosure, an example in which the compression unit 40 operates with respect to one coefficient is described. The coefficients may be compressed in the same way, and a redundant description thereof is omitted.

The compression unit 40 may receive a compensation value of the compensation value provision unit 30.

The compression unit 40 compresses the compensation value by dividing a screen into a plurality of blocks before performing the compression and performing truncation coding based on the divided blocks.

The compression unit 40 may compress the compensation value by sequentially performing primary compression and secondary compression. The compression unit 40 may generate primary compression maps and representative values M of blocks for the primary compression by performing the primary compression on the compensation values for each block, and may generate a secondary compression map and a reference value R for the secondary compression by performing the secondary compression on the representative values M of the blocks.

After performing the sequential primary compression and secondary compression, the compression unit 40 may provide the primary compression maps, the reference value R, and the secondary compression map, that is, compensation information. In this case, it may be understood that each of the primary compression maps is a bitmap that is disposed in two dimensions and has difference values having a preset number of bits. It may be understood that the secondary compression map is a bitmap that is disposed in two dimensions and that has coding values having a preset number of bits. Illustratively, each of the difference value and the coding value may be set to be represented as 3 bits, and the reference value R may be set to be represented as 12 bits.

The compression information storage unit 50 may store the primary compression maps, the reference value R, and the secondary compression map, that is, the results of the compression provided by the compression unit 40, and may provide a display driving apparatus to be described later with the primary compression maps, the reference value R, and the secondary compression map as compensation information depending on a manufacturer's intention.

In the above description, the compression of the compression unit 40 is more specifically described with reference to FIGS. 2 to 8.

Figure 2:
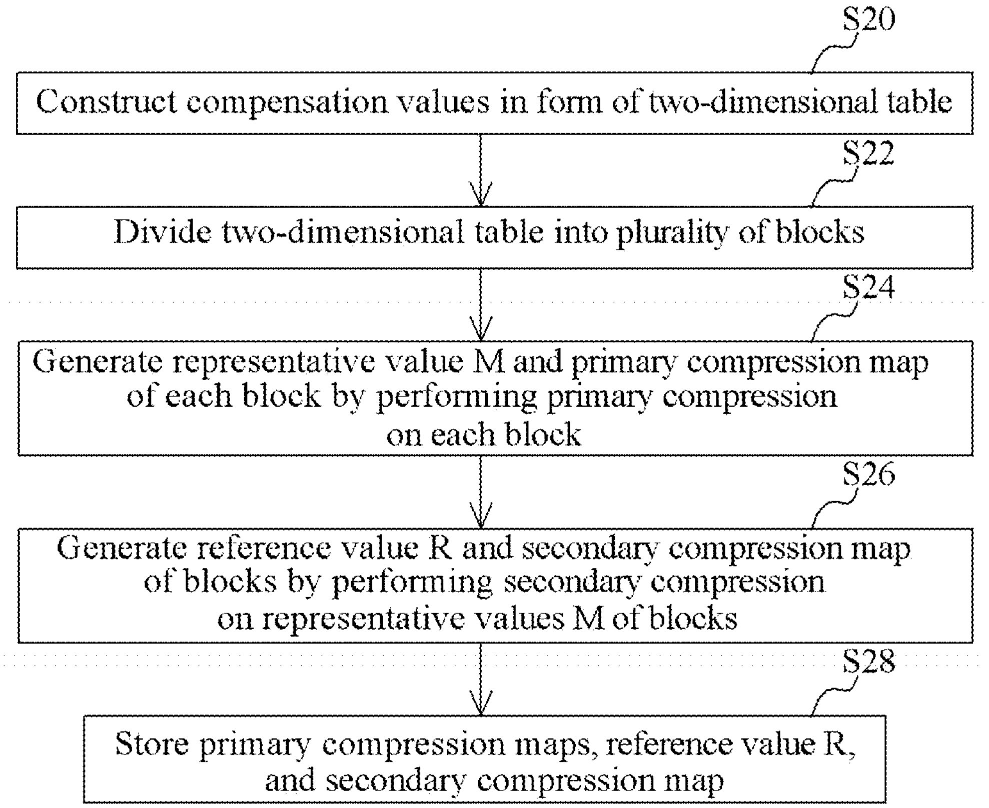
FIG. 2 is a flowchart illustrating a preferred embodiment of a method of providing compensation information for demura.

The compression unit 40 may perform primary compression and secondary compression as illustrated in FIG. 2.

The compression unit 40 constructs, in the form of a two-dimensional table, compensation values corresponding to one screen that is provided by the compensation value provision unit 30 by using location information of pixels (S20). That is, the compression unit 40 may construct the two-dimensional table by matching the compensation values with the location information of the pixels. It may be understood that the location information is a row location and column location of a pixel.

Thereafter, the compression unit 40 divides the two-dimensional table into a plurality of blocks for the block-based compression (S22). This may be understood that one screen is divided into a plurality of blocks. In this case, the blocks may have block location information, and compensation values included in the block may have pixel location information.

Figure 3:
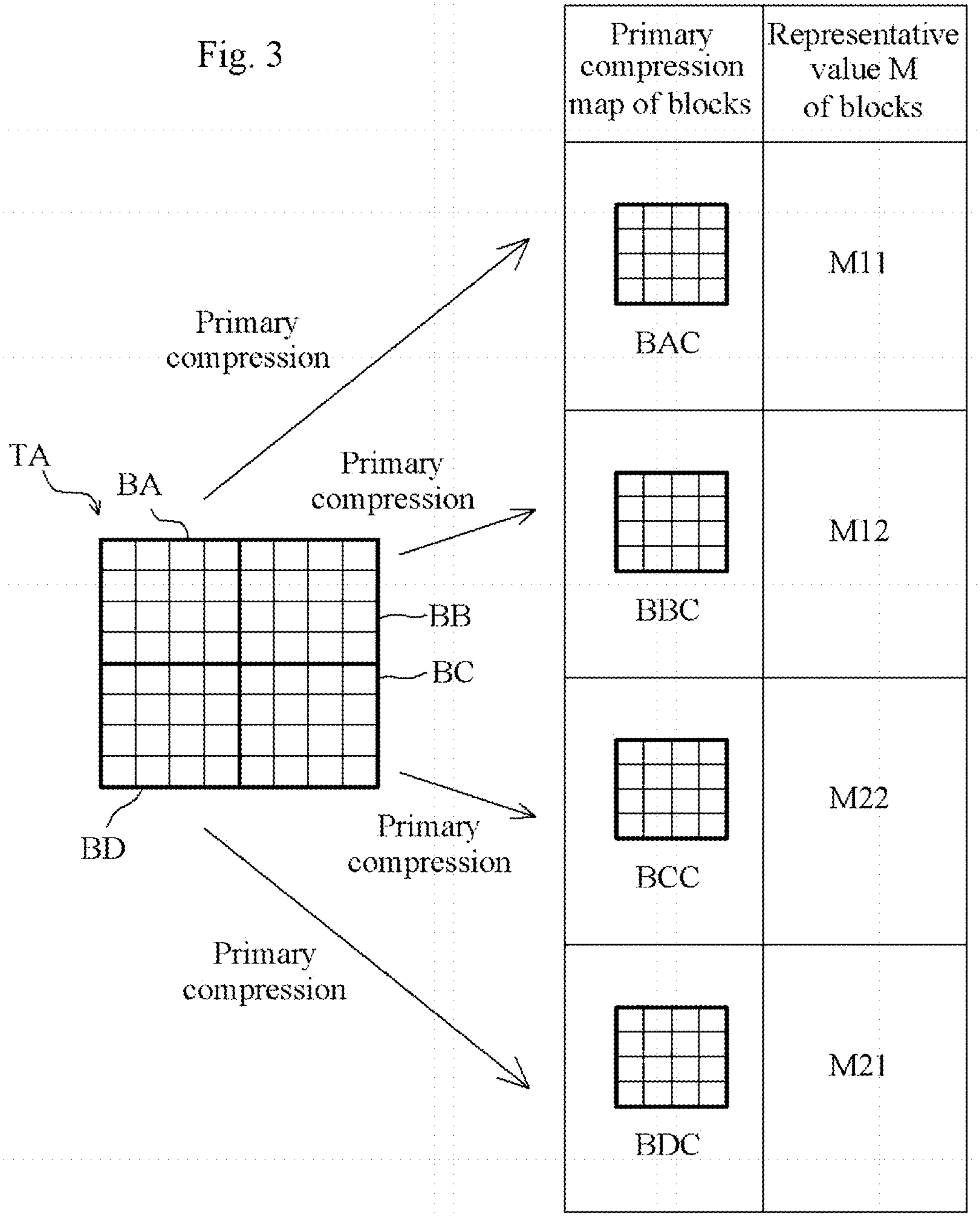
FIG. 3 is a diagram for describing primary compression.

Referring to FIG. 3, a two-dimensional table TA of compensation values for one screen may be divided into four blocks BA, BB, BC and BD, for example.

The compression unit 40 generates a representative value M and primary compression map of each block by performing primary compression on each of the blocks in FIG. 3 (S24). The primary compression is described later with reference to FIGS. 3 to 5.

After performing the primary compression, the compression unit 40 generates a reference value R and secondary compression map of the blocks by performing secondary compression on the representative values M of the blocks (S26). The secondary compression is described later with reference to FIGS. 6 to 8.

The compression unit 40 may generate the primary compression maps, the reference value R, and the secondary compression map by sequentially performing the primary compression and the secondary compression, and may store the primary compression maps, the reference value R, and the secondary compression map in the compression information storage unit 50 (S28).

Figure 4:
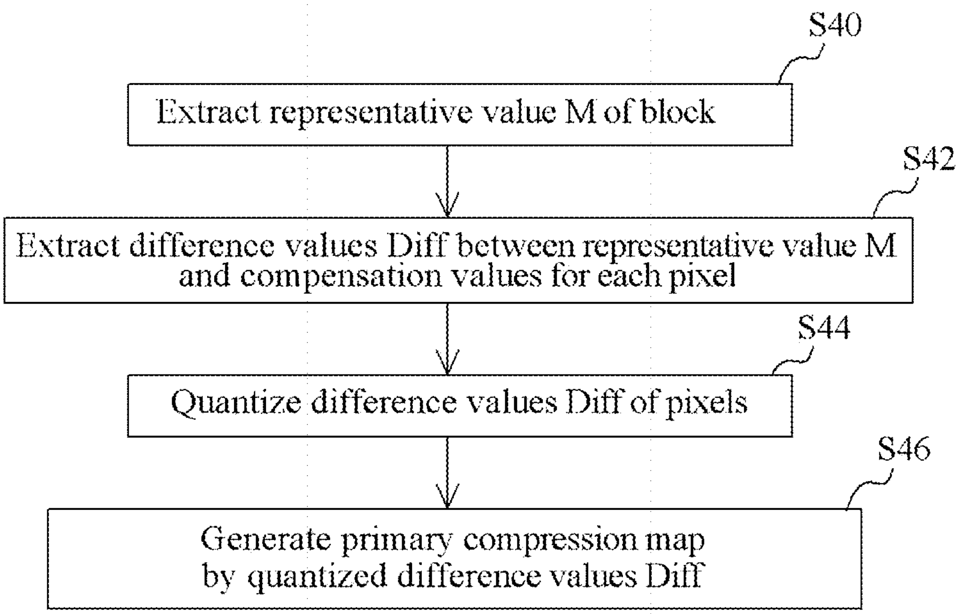
FIG. 4 is a detailed flowchart for describing primary compression.

In the above description, the primary compression of the compression unit 40 is described with reference to FIGS. 3 to 5.

In FIG. 3, the compression unit 40 performs primary compression on each of the blocks BA, BB, BC, and BD divided from the two-dimensional table TA. As in FIG. 3, a primary compression map BAC and representative value M11 of the block BA may be generated by primary compression for the block BA. A primary compression map BBC and representative value M12 of the block BB may be generated by primary compression for the block BB. A primary compression map BCC and representative value M13 of the block BC may be generated by primary compression for the block BC. A primary compression map BDC and representative value M14 of the block BD may be generated by primary compression for the block BD.

The primary compression for the blocks BA, BB, BC, and BD is performed in the same way. Accordingly, the primary compression for one block is described, and a detailed description of primary compression for each of the blocks is omitted.

The primary compression for one block is described with reference to FIG. 4. In the description of FIG. 4, a representative value of one block is indicated as M. It may be understood that the representative value M corresponds to any one of the representative value M11, M12, M13, and M14 depending on blocks that are selected for the primary compression.

The compression unit 40 extracts the representative value M of a block that has been selected for compression (S40).

The compression unit 40 may extract, as the representative value M, a compensation value of a pixel that has been designated as being located at the center of the selected block. Illustratively, if a block has m columns and n rows, a pixel at the center of a selected block may be selected as one of a pixel corresponding to information on a location that corresponds to m/2 columns and n/2 rows, a pixel corresponding to information on a location that is closest to the m/2 columns and the n/2 rows, or pixels corresponding to information on locations that are adjacent to the m/2 columns and the n/2 rows. The compensation value of the selected pixel may be extracted as the representative value M.

Furthermore, the compression unit 40 may extract, as the representative value M, a compensation value corresponding to a middle value. Illustratively, a middle value of a maximum value and a minimum value, that is, (a maximum value+a minimum value)/2, is "28.4", a compensation value "28" that is the closest value may be extracted as the representative value M.

In contrast, the compression unit 40 may calculate an average value of the compensation values of pixels included in a selected block, and may extract, as the representative value M, a compensation value corresponding to the average value. Illustratively, if an average value of the compensation values of pixels included in a selected block is "28", a compensation value "28" may be extracted the representative value M. Furthermore, if an average value of the compensation values of pixels included in a selected block is "28.4", a compensation value "28" that is the closest value may be extracted as the representative value M.

Hereinafter, it is assumed that the representative value M is "28" for a description.

After extracting the representative value M of the block as described above, the compression unit 40 extracts difference values Diff between the representative value M and compensation values for each pixel (S42).

Figure 5:
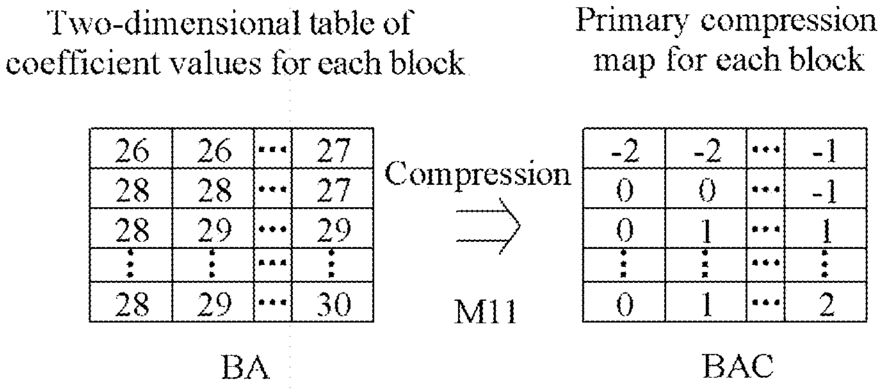
FIG. 5 is a diagram for describing a method of generating a primary compression map.
Figure 6:
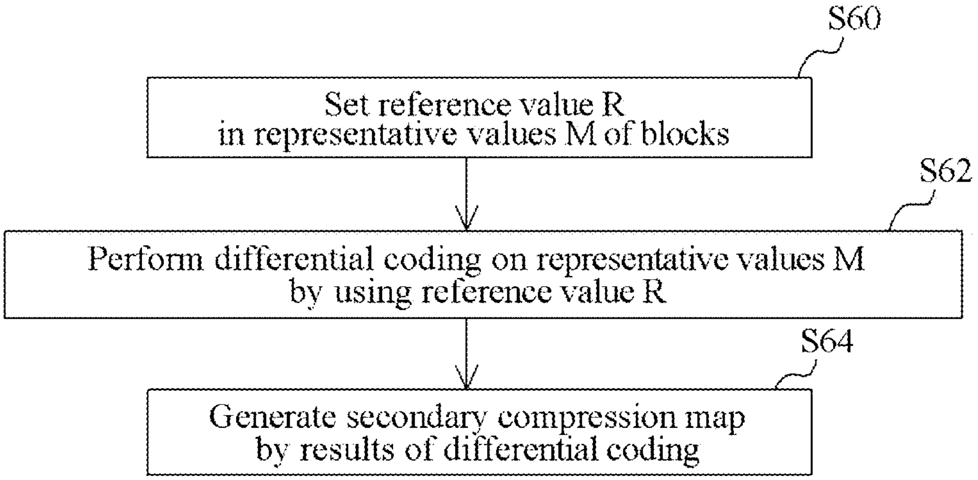
FIG. 6 is a detailed flowchart for describing secondary compression.
Figure 7:
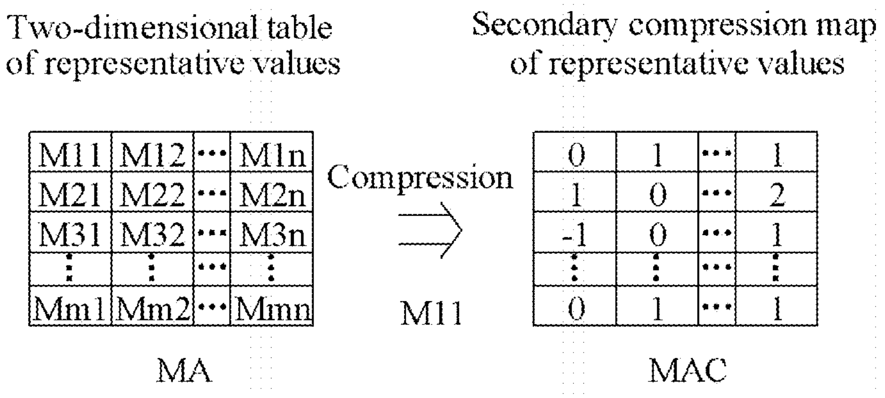
FIG. 7 is a diagram for describing a method of generating a primary compression map based on differential coding.

An exemplary two-dimensional table of the block BA and the primary compression map BAC by the primary compression of the compression unit 40 are illustrated in FIG. 5. In FIG. 3, the representative value of the block BA is indicated as M11. It may be understood that in FIG. 5, the representative value M11 corresponds to the representative value M described with reference to FIG. 4, that is, "28."

The compression unit 40 may calculate difference values between the representative value "28" and compensation values of the pixels of the block, and may extract the difference values Diff that are the results of the calculation. Illustratively, a difference value between a compensation value "26" and the representative value "28" may be extracted as "−2", a difference value between a compensation value "28" and the representative value "28" may be extracted "0", and a difference value between a compensation value "29" and the representative value "28" may be extracted "1."

The compression unit 40 performs quantization for representing the difference values Diff extracted in step S42 as a preset number of bits on the difference values Diff (S44).

By the quantization, the compression unit 40 may convert the difference values Diff within a range in which the difference values Diff may be represented as a preset number of bits into a quantized binary value that has the number of bits suitable for a corresponding value.

If difference values Diff deviate from a range in which the difference values Diff may be represented as a preset number of bits, the difference value Diff may be set as a preset value.

Illustratively, a difference value Diff having a greater value than a value which may be represented as a preset number of bits is quantized as a maximum value which may be represented as a preset number of bits. Furthermore, a difference value Diff having a smaller value than a value which may be represented as a preset number of bits is quantized as a minimum value which may be represented as a preset number of bits.

As a detailed example, assuming that a maximum value which may be represented as a preset number of bits is "4" and a minimum value which may be represented as a preset number of bits is "−3", a difference value Diff "5" may be quantized as a value corresponding to the maximum value "4" because the difference value Diff "5" is greater than a value which may be represented as a set number of bits for the quantization. A difference value Diff "−4" may be quantized as a value corresponding to the minimum value "−3" because the difference value Diff "−4" is smaller than a value which may be represented as a set number of bits for the quantization.

The compression unit 40 may generate a bitmap, that is, a primary compression map, by mapping the difference values Diff that have been quantized as described above based on location information of the pixels (S46). The primary compression map BAC in FIG. 5 illustrates a bitmap in which the quantized difference values Diff have been mapped for each pixel.

The compression unit 40 may generate representative values M and primary compression maps of blocks by primary compression.

Thereafter, the compression unit 40 performs secondary compression on the representative values M of the blocks. The secondary compression of the compression unit 40 is described with reference to FIGS. 6 to 8.

The compression unit 40 constructs a two-dimensional table MA of the representative values M corresponding to blocks for secondary compression. The two-dimensional table MA of the representative values M may be understood with reference to FIG. 7.

The compression unit 40 may construct the two-dimensional table MA of the representative values M by using block location information of the blocks. That is, the representative values may be mapped to the two-dimensional table MA based on the locations of the blocks that are arranged on a screen.

The compression unit 40 may perform secondary compression by using differential coding.

The compression unit 40 may set a reference value R in the representative values of the blocks of the two-dimensional table MA for the differential coding (S60).

The reference value R may be understood as the first value for coding values that are sequentially changed. In an embodiment of the present disclosure, the representative value M11 that is located at the first column of the first row of the two-dimensional table MA may be used as the reference value R.

When the reference value R is set, the compression unit 40 performs the differential coding on the representative values M of the two-dimensional table MA by using the reference value R (S62). The compression unit 40 may generate a secondary compression map MAC of the representative values M in FIG. 7, which correspond to the blocks, by coding values that are generated as the results of the execution of the differential coding (S64).

A differential coding method is described with reference to FIG. 8.

Figure 8:
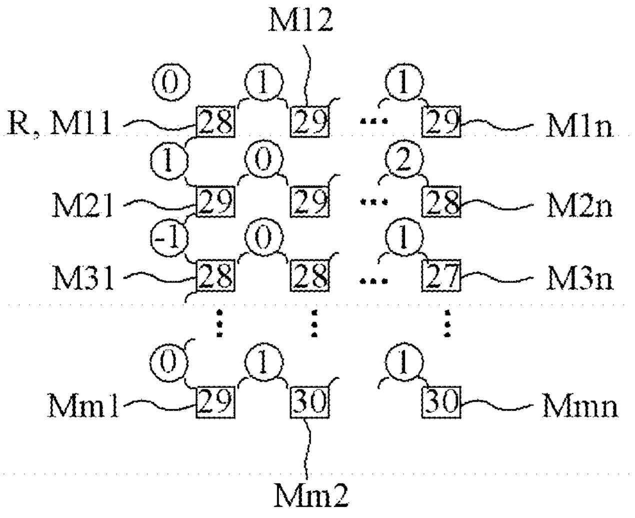
FIG. 8 is a diagram for describing the differential coding.

In FIG. 8, numbers within block boxes correspond to representative values of blocks. That is, the numbers within the block boxes correspond to values to which the representative values M of the blocks have been mapped for each location of the two-dimensional table MA.

It may be understood that the differential coding includes calculating coding values obtained by calculating differences between representative values of adjacent columns and coding values obtained by calculating differences between representative values of adjacent rows that belong to the first column, and generating the two-dimensional table MAC by mapping the coding values calculated by the method based on location information of the blocks. The coding values correspond to numbers within circles in FIG. 8. The two-dimensional table MAC that has been generated as described above corresponds to the secondary compression map of the representative values of the blocks, which is generated by an embodiment of the present disclosure.

More specifically, a coding value “0” corresponding to the first column of the first row of the secondary compression map corresponds to a difference between the reference value R and a representative value “28” located at the first column of the first row of the two-dimensional table MA. A coding value “1” corresponding to the second column of the first row of the secondary compression map corresponds to a difference between the representative value “28” located at the first column of the first row of the two-dimensional table MA and a representative value “29” located at the second column of the first row of the two-dimensional table MA. Coding values may be calculated by calculating differences between representative values of adjacent columns by using the method.

Furthermore, the coding value “0” corresponding to the first column of the first row of the secondary compression map corresponds to a difference between the reference value R and the representative value “28” located at the first column of the first row of the two-dimensional table MA. A coding value “1” corresponding to the first column of the second row of the secondary compression map corresponds to a difference between the representative value “28” located at the first column of the first row of the two-dimensional table MA and the representative value “29” located at the first column of the second row of the two-dimensional table MA. Coding values may be calculated by calculating differences between representative values of adjacent rows that belong to the first column by using the method.

The compression unit 40 may generate a secondary compression map and reference value R for secondary compression by performing the secondary compression on the representative values of the blocks.

As described above, the compression unit 40 may generate primary compression maps corresponding to blocks by the primary compression, and may generate a secondary compression map corresponding to a reference value and representative values of the blocks by the secondary compression.

The compression information storage unit 50 may store the primary compression maps, the reference value R, and the secondary compression map as compensation information, and may provide the compensation information to the display driving apparatus to be described later with reference to FIG. 9 depending on a manufacturer’s intention.

The aforementioned embodiment of the present disclosure can efficiently compress compensation information through primary compression for blocks and secondary compression for representative values of the blocks.

Furthermore, the compensation information can be compressed to have a small size by the compression according to an embodiment of the present disclosure. As a result, the capacity of a memory for storing the compensation information can be reduced.

Furthermore, in an embodiment of the present disclosure, the compression of representative values of blocks and the compression of compensation values of the blocks can be separately performed in block-based compression. Accordingly, when an error occurs in a block, the propagation of the error is limited within the blocks. Accordingly, an increase in the error attributable to the propagation of the error can be suppressed.

Furthermore, an embodiment of the present disclosure can solve a problem with a block artifact, which chiefly occurs in block-based compression because compensation values of pixels are compressed in a block unit.

Furthermore, in an embodiment of the present disclosure, a loss may be small or a loss may not be present because secondary compression using adjacent blocks usually having similar values is performed. Accordingly, a compression ratio of compensation information can be increased.

Figure 9:
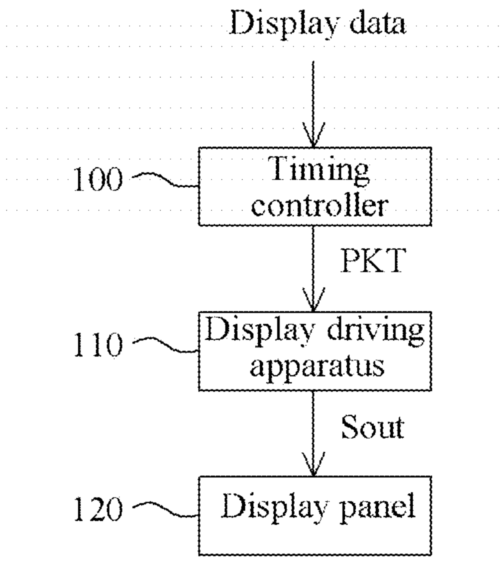
FIG. 9 is a block diagram exemplifying a display system.

As in FIG. 9, display data is provided to a timing controller 100. The timing controller 100 constructs a packet PKT for the display data and provides the packet PKT to a display driving apparatus 110.

The display driving apparatus 110 is constructed to restore the display data after receiving the packet, generate source signals Sout corresponding to the display data, and provide the source signals Sout to a display panel 120.

Figure 10:
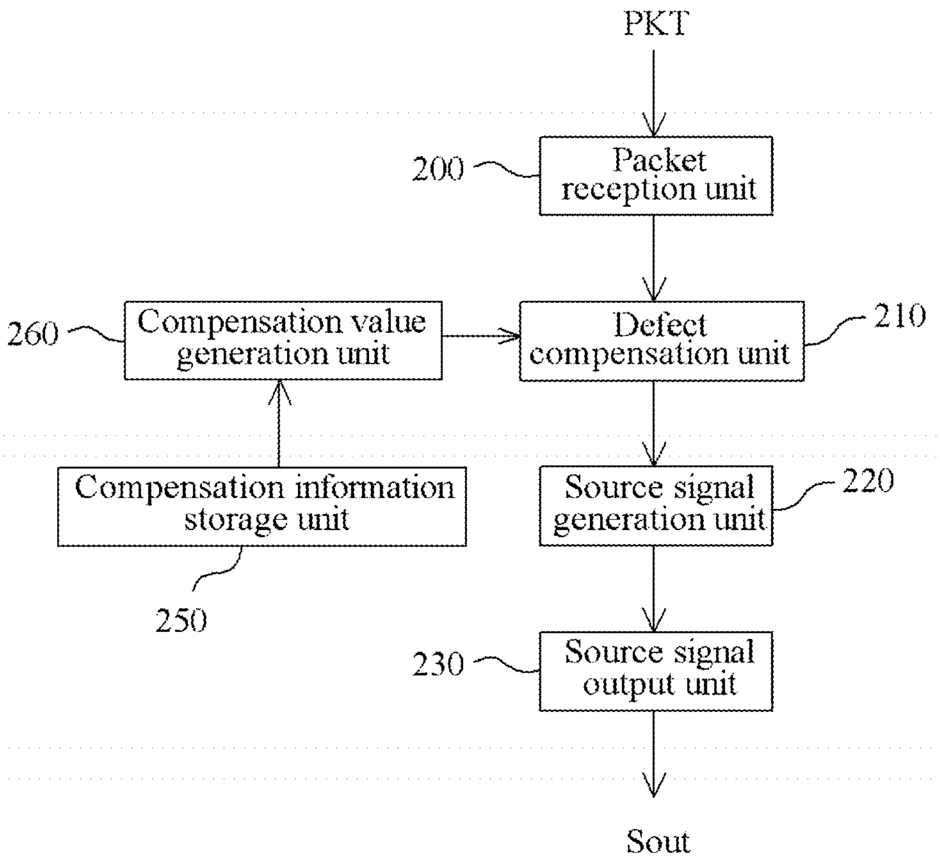
FIG. 10 is a detailed block diagram of a display driving apparatus according to the present disclosure.

In FIG. 9, the display driving apparatus 110 may be constructed as in FIG. 10, for example.

Referring to FIG. 10, a driver 110 may include a packet reception unit 200, a defect compensation unit 210, a source signal generation unit 220, a source signal output unit 230, a compensation information storage unit 250, and a compensation value generation unit 260.

The packet reception unit 200 receives a packet PKT for display data that is provided by the timing controller 100, and restores the display data from the packet PKT.

The defect compensation unit 210 has a construction for compensating for a defect by using the compensation equation of Equation 1, and compensates for display data so that the defect is solved by applying coefficient values for each pixel, which are provided by the coefficient value generation unit 260.

The source signal generation unit 220 drives a source signal Sout in accordance with the display data that has been compensated for. The source signal output unit 230 provides the display panel 120 with the source signal Sout that is driven by the source signal generation unit 220.

The compensation information storage unit 250 may be constructed by using memory, such as flash memory. The compensation information storage unit 250 may store the compensation information generated according to the embodiment of FIG. 1, that is, the primary compression maps, the reference value R. and the secondary compression map, and may provide the compensation information to the compensation value generation unit 260.

The compensation value generation unit 260 converts coding values of the secondary compression map into representative values of a plurality of blocks divided from a screen by using the reference value. That is, the compensation value generation unit 260 performs decoding on secondary compression. More specifically, the compensation value generation unit 260 may generate the representative values of the plurality of blocks by decoding coding values of the secondary compression map MAC, which have been subjected to differential coding, by using the reference value R, and may thus generate the two-dimensional table MA of the representative values.

Thereafter, the compensation value generation unit 260 converts difference values of the primary compression maps into compensation values corresponding to pixels of a corresponding block by using the representative values for each block. That is, the compensation value generation unit 260 performs decoding on primary compression. More specifically, the compensation value generation unit 260 may generate the two-dimensional table BA of the compensation values for each block by adding each of the difference values of the primary compression maps BAC to a representative value of the two-dimensional table MA that is generated as the results of the decoding of the secondary compression map MAC.

The compensation value generation unit 260 may provide the defect compensation unit 210 with a coefficient value, that is, a compensation value of a screen for each pixel, through the decoding.

The defect compensation unit 210 receives the display data of the packet reception unit 200 and the compensation value of the compensation value generation unit 260 for each pixel.

The defect compensation unit 210 may compensate for the display data by using the compensation equation in which the compensation value has been applied to the coefficient value, and may output the display data that has been compensated for.

More specifically, the defect compensation unit 210 may compensate for the display data by substituting the compensation equation of Equation 1 with the coefficient values of coefficients for each pixel, which are provided by the coefficient value generation unit 260 as described above.

Accordingly, the display driving apparatus according to the present disclosure can store and provide a coefficient value by using a memory having a small capacity, and can excellently compensate a defect, such as mura, while preventing artifacts by using compression values having association between adjacent data by using a two-dimension compensation bitmap.

What is claimed is:

1. An apparatus for providing compensation information for demura, the apparatus comprising:

a compensation value provision unit configured to provide compensation values of pixels; and a compression unit configured to divide a screen into a plurality of blocks, generate a primary compression map and a representative value for each block by performing primary compression on compensation values of pixels for each block, and generate a secondary compression map and a reference value by performing the secondary compression on representative values of the blocks, wherein the primary compression comprises:

extracting the representative value for the compensation values of the block, extracting difference values between the representative values and the compensation values, and generating the primary compression map corresponding to pixels of the block by the difference values, and wherein the secondary compression comprises:

setting the reference value of the representative values, performing differential coding on the representative values by using the reference value, and generating the secondary compression map corresponding to the blocks by coding values that are generated as results of the differential coding.

2. The apparatus of claim 1, wherein the compensation value provision unit provides, as the compensation values, coefficient values of coefficients of a compensation equation for demura of the pixels.

3. The apparatus of claim 1, wherein the compression unit provides the primary compression map, the reference value, and the secondary compression map as compensation information.

4. The apparatus of claim 1, wherein:

the compensation value provision unit provides location information and the compensation values for the pixels, and the compression unit generates the primary compression map to which the difference values have been mapped by using the location information and the secondary compression map to which the coding values have been mapped corresponding to the blocks.

5. The apparatus of claim 1, wherein:

the primary compression map comprises a two-dimensional table corresponding to pixels of the block, and the secondary compression map comprises the two-dimensional table corresponding to the blocks.

6. The apparatus of claim 1, wherein the compression unit extracts, as the representative value, the compensation value of the pixel that has been disposed at a center of the block.

7. The apparatus of claim 1, wherein the compression unit calculates a middle value between a maximum value and minimum value of the compensation values of the pixels included in the block, and extracts, as the representative value, the compensation value corresponding to the middle value.

8. The apparatus of claim 1, wherein the compression unit calculates an average value of the compensation values of the pixels included in the block, and extracts, as the representative value, the compensation value corresponding to the average value.

9. The apparatus of claim 1, wherein the compression unit performs quantization for representing the extracted difference values as a preset number of bits, and generates, as the primary compression map, a bitmap comprising the quantized difference values.

10. The apparatus of claim 9, wherein the compression unit sets, as a preset value, the difference value that has deviated from a range in which the extracted difference values are represented as the preset number of bits through the quantization.

11. The apparatus of claim 10, wherein the compression unit quantizes the difference value having a value greater than a value capable of being represented as the preset number of bits, as a maximum value capable of being represented as the preset number of bits, and quantizes the difference value having a value smaller than a value capable of being represented as the preset number of bits, as a minimum value capable of being represented as the preset number of bits.

12. A method of providing compensation information for demura, the method comprising:

dividing a screen into a plurality of blocks;

performing primary compression on compensation values of pixels for each block, and generating a primary compression map and a representative value for the primary compression of the block; and performing secondary compression on representative values of the blocks, and generating a secondary compression map and a reference value for the secondary compression of the block, wherein the primary compression comprises:

extracting the representative value for the compensation values of the block, extracting difference values between the representative values and the compensation values, and generating the primary compression map corresponding to pixels of the block by the difference values, and wherein the secondary compression comprises:

setting the reference value of the representative values, performing differential coding on the representative values by using the reference value, and generating the secondary compression map corresponding to the blocks by coding values that are generated as results of the differential coding.

13. The method of claim 12, wherein the compensation values correspond to coefficient values of coefficients of a compensation equation for demura of the pixels.

14. The method of claim 12, wherein:

the primary compression map comprises a two-dimensional table corresponding to pixels of the block, and the secondary compression map comprises the two-dimensional table corresponding to the blocks.

15. The method of claim 12, wherein the representative value corresponds to the compensation value of the pixel that has been disposed at a center of the block.

16. The method of claim 12, further comprising:

calculating a middle value between a maximum value and minimum value of the compensation values of the pixels included in the block, and extracting, as the representative value, the compensation value corresponding to the middle value.

17. The method of claim 12, wherein the representative value corresponding to an average value of the compensation values of the pixels included in the block.

18. The method of claim 12, further comprising:

performing quantization for representing the extracted difference values as a preset number of bits, wherein the primary compression map is generated as a bitmap comprising the quantized difference values, and the quantization comprises setting, as a preset value, the difference value that has deviated from a range in which the extracted difference values are represented as the preset number of bits.

19. A display driving apparatus comprising:

a compensation information storage unit configured to store and provide primary compression maps having difference values, a secondary compression map having coding values, and a reference value;

a compensation value generation unit configured to convert the coding values of the secondary compression map into representative values of a plurality of blocks divided from a screen by using the reference value, convert the difference values of the primary compression maps into compensation values corresponding to pixels of a corresponding block by using the representative values for each block, and provide the compensation value for each pixel; and a defect compensation unit configured to receive display data and the compensation value for each pixel, compensate for the display data by using a compensation equation in which the compensation value has been applied to a coefficient value, and output the display data that has been compensated for.

20. The display driving apparatus of claim 19, wherein the compensation value generation unit generates the representative values by decoding the coding values subjected to differential coding by using the reference value, and generates the compensation values corresponding to the pixels of the block by adding the difference value to each of the representative values.

* * * * *